United States Patent [19]
Leyshon et al.

[11] Patent Number: 4,968,883
[45] Date of Patent: Nov. 6, 1990

[54] APPARATUS AND METHOD FOR VERTICAL MOUNTING OF AN OPTICAL SCANNER

[75] Inventors: Frank A. Leyshon, Cambridge; David M. J. Allgeier, Cumberland, both of Ohio

[73] Assignee: NCR Corporation, Dayton, Ohio

[21] Appl. No.: 424,627

[22] Filed: Oct. 20, 1989

[51] Int. Cl.⁵ .............................................. G06K 7/12
[52] U.S. Cl. .................................... 250/239; 235/462; 250/568; 312/223; 312/254
[58] Field of Search ............. 250/239, 566, 568, 234, 250/236; 235/462, 467, 470, 383; 358/254; 361/331, 390; 186/61; 312/223, 254, 256, 263, 265.5, 111, 140; 455/90, 605

[56] References Cited

U.S. PATENT DOCUMENTS

| | | |
|---|---|---|
| 4,044,227 | 8/1977 | Holm et al. .......................... 250/568 |
| 4,253,018 | 2/1981 | Amacher et al. . |
| 4,272,675 | 6/1981 | Blanford et al. . |
| 4,275,380 | 6/1981 | Gardner et al. . |
| 4,282,426 | 8/1981 | Neseem et al. . |
| 4,287,507 | 9/1981 | Janes et al. . |
| 4,652,732 | 3/1987 | Nickl ................................... 235/462 |
| 4,679,154 | 7/1987 | Blanford . |
| 4,762,984 | 8/1988 | Knowles et al. ..................... 235/383 |
| 4,789,048 | 12/1988 | Cramer et al. ......................... 186/61 |
| 4,838,383 | 6/1989 | Saito et al. ............................ 186/61 |

*Primary Examiner*—Edward P. Westin
*Attorney, Agent, or Firm*—Wilbert Hawk, Jr.; Albert L. Sessler, Jr.

[57] ABSTRACT

A housing assembly for an optical scanner is provided to enable the scanner to be mounted in a vertical orientation. The assembly includes a rear unit, a front unit and a base unit, all of which can be assembled together without the use of screws or similar fasteners, with the scanner positioned within the assembled front and rear units. The assembly with the included scanner can be placed on the horizontal check-out counter of a point of sale system for use in said system.

12 Claims, 8 Drawing Sheets

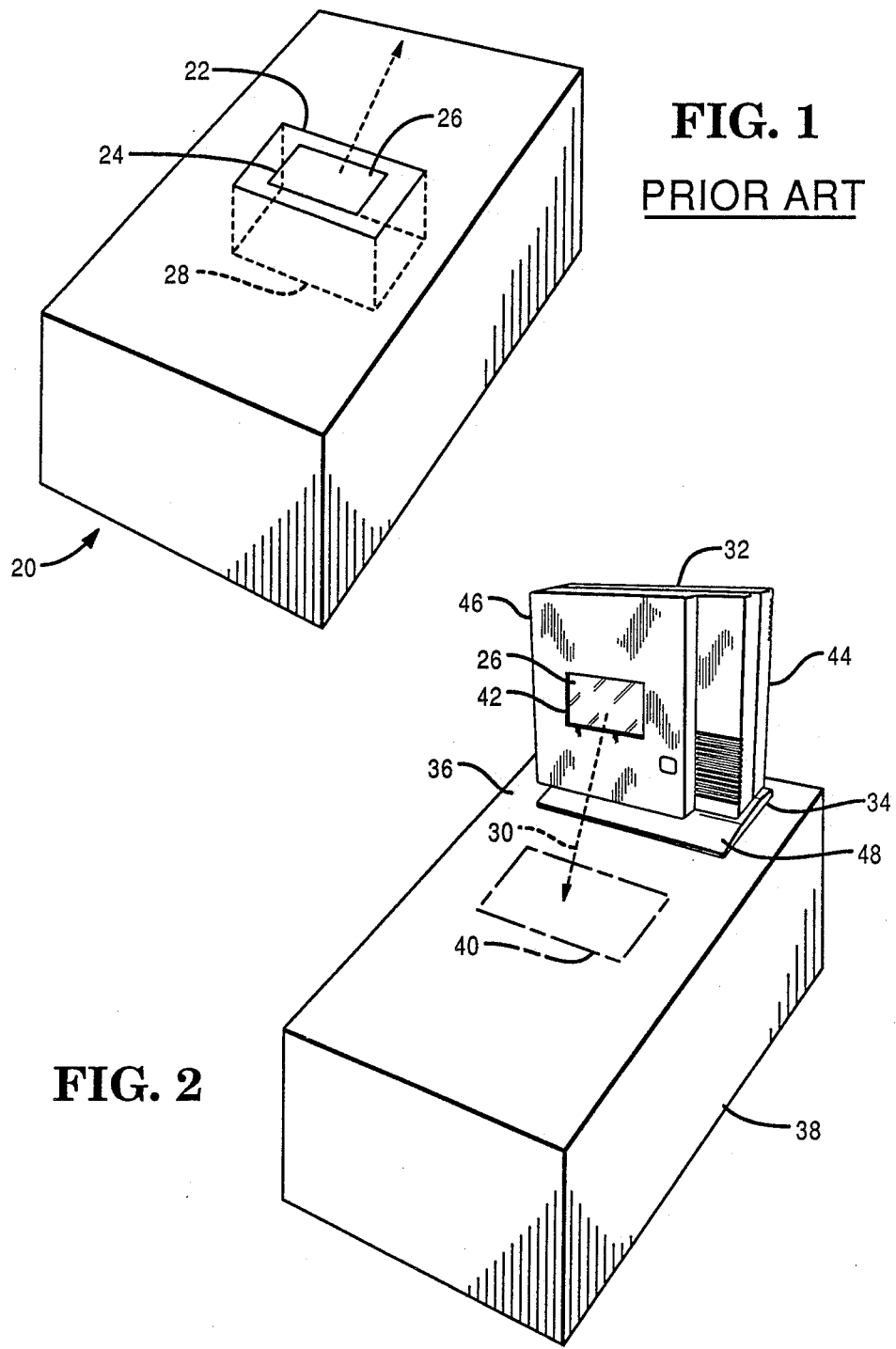

APPARATUS AND METHOD FOR VERTICAL MOUNTING OF AN OPTICAL SCANNER

CROSS-REFERENCE TO RELATED APPLICATION

Bar Code Scanner or Similar Article, U.S. patent application Ser. No. 354,335, filed May 19, 1989, inventor David M. J. Allgeier, assigned to the assignee of the present application.

BACKGROUND OF THE INVENTION

This invention relates generally to optical scanners for scanning record media, and more particularly relates to an apparatus and method for vertical mounting of an optical scanner.

The use of symbols or labels which comprise bar codes as a means of identifying data which is used in processing items sold in the retail industry, and for other purposes as well, has been widely accepted. A particular bar code, such as the Universal Product Code (UPC), has been established as the industry standard for the grocery and other related retail industries.

In present-day merchandise checkout systems, the use of optical scanners or readers for scanning the UPC labels on purchased merchandise items has become quite common. In the checkout systems in use today, the optical reader can take the form of a reader mechanism located in a checkout counter, or the form of a hand-held wand. In either case, the optical reader will scan the bar code pattern that forms the UPC label, and will generate signals representing the bars and spaces of the pattern for transmission to a processor which determines the character represented by the bar code pattern. The character which identifies the purchased items is then transmitted to an associated data terminal device and from there to a remote or back office processor which looks up the price of the item in a table located in the processor. The price is then transmitted back through the terminal device, where the price is printed on a receipt by a printer mechanism located in the terminal device, and then to a customer display located adjacent to the checkout counter where the price of the item is displayed. If an error occurs due to a malfunction of the printer or if the price of the item is not listed in the price lookup table, error signals are generated, notifying the operator to take appropriate action to correct the problem.

Scanners employed in merchandise checkout systems are frequently mounted horizontally in checkout counters with a transparent window mounted flush with the horizontal surface of the counter, so that articles bearing UPC symbols to be scanned are drawn across the scanning window by the operator of the checkout system. However such an arrangement has certain disadvantages. Laser scanning beams are projected upwardly through the scanner window, which could be objectionable in certain instances. The tranparent window may become scratched or dirty by virtue of merchandise articles being constantly dragged over it. Window cleaning or replacement may be periodically required at considerable expense. Also, laws and/or regulations in some countries may provide that an operator of a checkout system must be able to sit while at work. This may limit the vertical space in a counter in which a scanner unit may be disposed.

For these reasons, a vertically mounted scanner, in which the scanning beams are projected horizontally or in a downwardly-angled orientation, may be advantageous. Such an installation eliminates the problem of dirty or damaged scanner windows, and does not require the use of space beneath the counter surface, thus making simpler the design of a scanning system in which the operator can sit with legs extending beneath the counter.

SUMMARY OF THE INVENTION

In the present invention, a housing assembly for an optical scanner provides means for mounting said scanner in a vertical orientation. The assembly can be used as a kit for accomplishing such a vertical mounting on a counter originally designed for a flush-mounted horizontal scanner, and provides a method for converting a horizontally mounted scanner into one which is vertically disposed with respect to a counter.

In accordance with one embodiment of the invention, an assembly for a vertically mounted optical scanner to provide for the mounting of an optical scanning unit having a transparent face comprises: a rear unit of generally rectangular configuration having upper, lower and side surfaces and having interior support means to receive and position an optical scanning unit, said rear unit also having first securing means adjacent its upper surface to engage a front unit, and having second securing means on its lower surface to engage a base unit; a front unit of generally rectangular configuration having front, upper, lower and side surfaces, having an aperture in its front surface to receive the transparent face of the optical scanning unit, having first securing means adjacent its upper surface to engage the first securing means of the rear unit and having second securing means on its lower surface to engage a base unit; and a base unit having a lower surface for resting upon a counter and having an upper surface which includes securing means to engage the second securing means of both the rear unit and the front unit to retain the rear unit, the front unit and the base unit in assembled relation.

In accordance with a second embodiment of the invention, a kit for vertical mounting of an optical scanner on a counter comprises: first and second vertical mount housing elements for retaining an optical scanning unit between them; and a base for retaining said first and second housing elements in assembled relationship, said base having a lower surface adapted to rest on the surface of said counter.

In accordance with a third embodiment of the invention, a vertical scanner assembly comprises: a checkout counter having a horizontal surface; an optical scanning unit; and a vertical housing member in which said optical unit is housed, comprising front and rear housing members, engaging means for securing said front and rear housing members together adjacent their top surfaces and a base member securing said front and rear housing members together adjacent their bottom surfaces, said base member including a bottom surface resting on the horizontal surface of said counter.

In accordance with a fourth embodiment of the invention, a method of converting an optical scanner which is horizontally disposed in a checkout counter to one which is vertically disposed adjacent to said counter, comprises the following steps: (a) removing said optical scanner from said counter; (b) providing a vertical mount housing kit comprising a front unit, a rear unit and a base unit, all having top and bottom surfaces; (c) placing the optical scanner within said front unit; (d) engaging said rear unit with said front unit adjacent the top surfaces thereof and positioning said rear unit over said optical scanner; (e) securing said front and rear units together adjacent the bottom surfaces thereof by engagement with the top surface of said base unit; and (f) positioning said assembled vertical mounting housing kit, with the optical scanner inside, on the counter, with said assembled kit resting on the bottom surface of said base unit.

In accordance with a fifth embodiment of the invention, a method of providing a vertical mounting for an optical scanner on a counter comprises the following steps: (a) providing a vertical mount housing kit comprising a front unit, a rear unit and a base unit, all having top and bottom surfaces; (b) placing the optical scanner within said front unit; (c) engaging said rear unit with said front unit adjacent the top surfaces thereof and positioning said rear unit over said optical scanner; (d) securing said front and rear units together adjacent the bottom surfaces thereof by engagement with the top surface of said base unit; and (e) positioning said assembled vertical mounting housing kit, with the optical scanner inside, on the counter, with said assembled kit resting on the bottom surface of said base unit.

It is accordingly an object of the present invention to provide an assembly for vertically mounting an optical scanner.

Another object is to provide a kit for vertically mounting an optical scanner on a counter.

Another object is to provide a vertical scanner assembly which comprises a checkout counter, an optical scanning unit and a vertical housing member for holding said optical scanning unit.

Another object is to provide a method of converting an optical scanner which is horizontally disposed in a checkout counter to one which is vertically disposed adjacent to said counter.

Another object is to provide a method of providing a vertical mounting for an optical scanner on a counter.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 1 is a perspective view of a conventional checkout counter in which an optical scanner is mounted in the horizontal surface of the counter.

FIG. 2 is a perspective view of a checkout counter in which an optical scanner is mounted in a vertical housing.

DESCRIPTION OF THE PREFERRED EMBODIMENT

Figure 3:
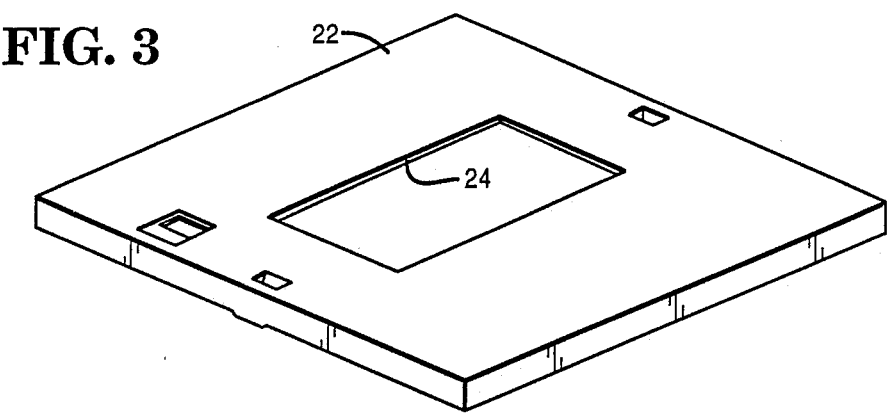
FIG. 3 is a perspective view of a cover plate used in horizontal mounting of an optical scanner.
Figure 4:
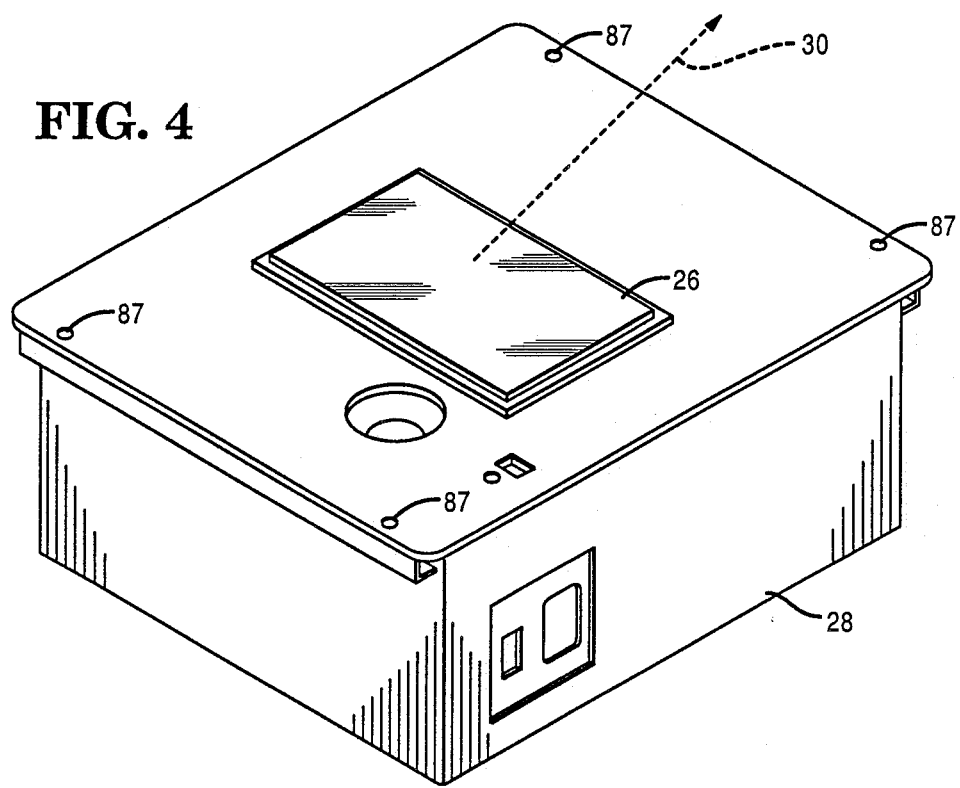
FIG. 4 is a perspective view of an optical scanner.
Figure 5:
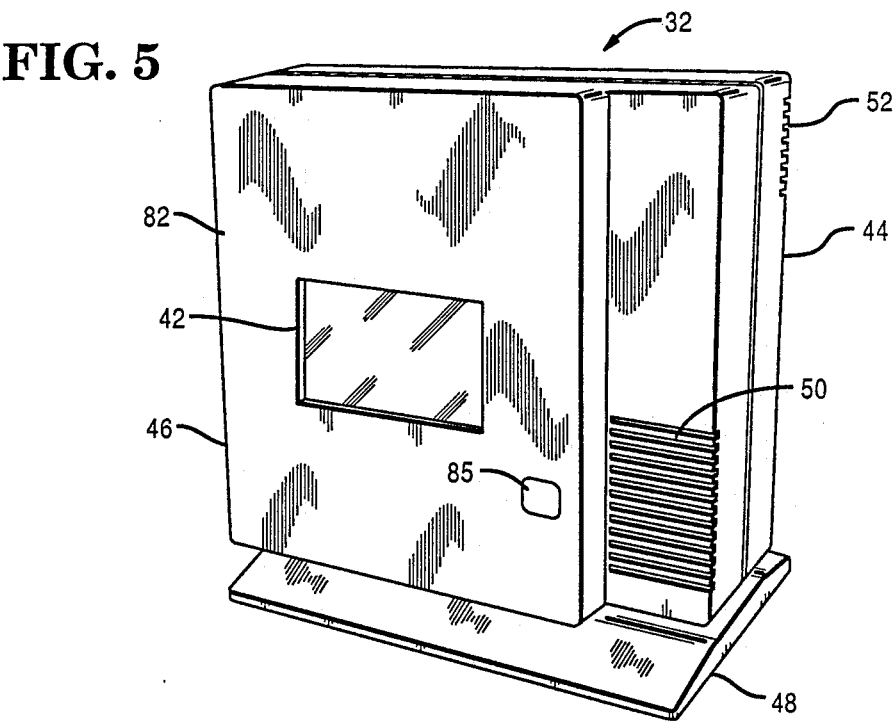
FIG. 5 is a right front perspective view of a vertical housing for an optical scanner.
Figure 6:
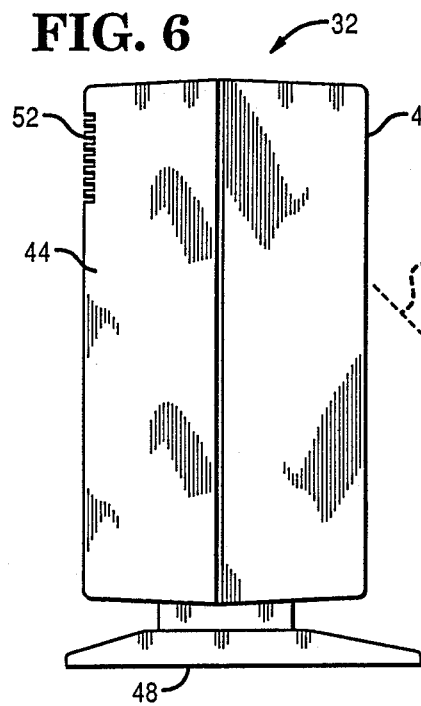
FIG. 6 is a left side elevational view of the vertical housing of FIG. 5.
Figure 7:
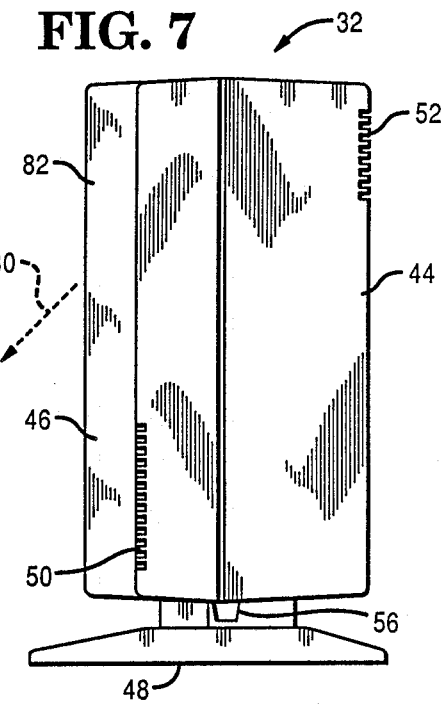
FIG. 7 is a right side elevational view of the vertical housing of FIG. 5.
Figure 8:
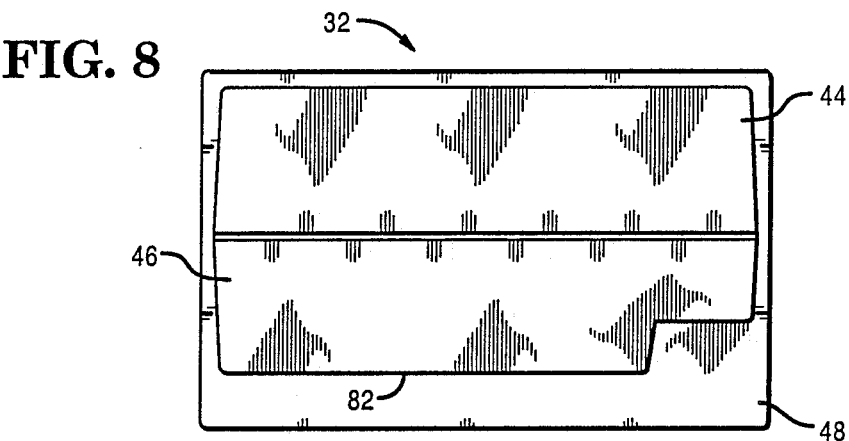
FIG. 8 is a top plan view of the vertical housing of FIG. 5.
Figure 9:
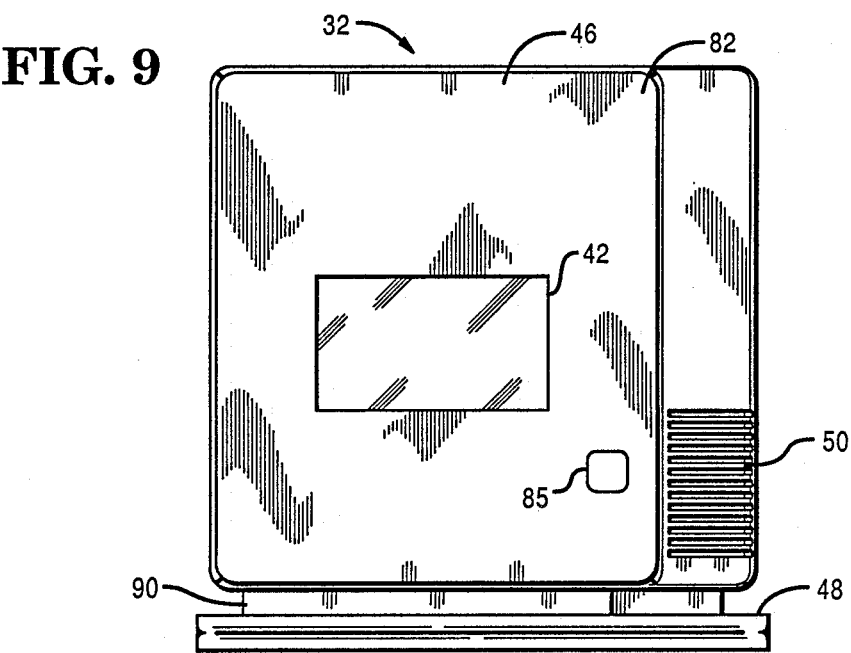
FIG. 9 is a front elevational view of the vertical housing of FIG. 5.
Figure 10:
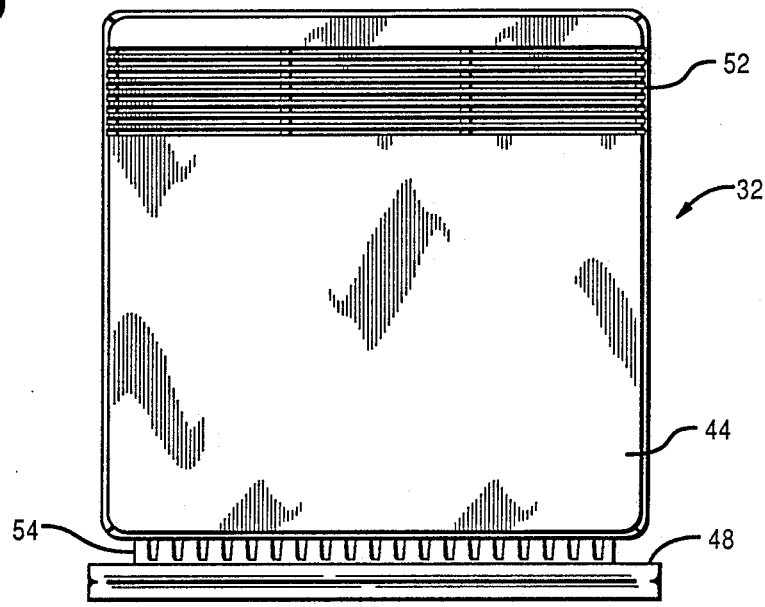
FIG. 10 is a rear elevational view of the vertical housing of FIG. 5.
Figure 11:
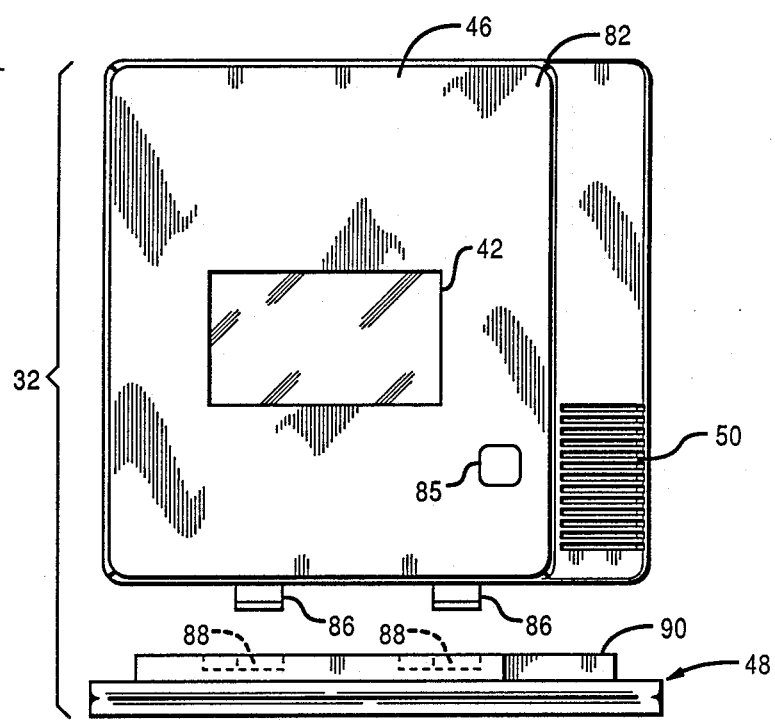
FIG. 11 is a front elevation view of the vertical housing of FIG. 5, showing the base member thereof disassembled from the remainder of the housing.

Referring now to FIG. 1, shown there is a conventional counter 20 forming part of a checkout system which will customarily also include a point of sale (POS) terminal (not shown) operated by a human operator. Mounted flush with the horizontal surface of the counter is a cover plate 22 having therein an aperture 24 for receiving a transparent window 26 of glass, plastic or other suitable material. The tranparent window 26 forms part of an optical scanner 28 which is mounted in the counter 20 below the cover plate 22. The scanner 28 is capable, as is wellknown, of generating scanning beams, as represented by the line 30 in FIG. 4, by means of a laser or other suitable device. Such beams are directed upwardly at an angle through the window 26 to scan UPC or other symbols on merchandise which is moved by the operator across the window 26. The data which is obtained from scanning of the UPC symbols is employed in a merchandise check-out transaction.

For a more detailed description of the bar code reader or scanner 28, and the bar code which is read, reference may be had to the following United States patents, which are assigned to the assignee of the present application: 4,253,018, issued Feb. 24, 1981; 4,272,675, issued June 9, 1981; 4,275,380, issued June 23, 1981; 4,282,426, issued Aug. 4, 1981; 4,287,507, issued Sept. 1, 1981; and 4,679,154, issued July 7, 1987.

As has been previously described, it may be advantageous in certain checkout system installations to provide an installation for the scanner 28 in which it is installed in a vertical, rather than horizontal, orientation with respect to the horizontal surface of a checkout counter. Such an installation is shown in FIG. 2 in which the scanner 28 is enclosed in a vertical mount assembly 32 having a lower surface 34 which rests upon the surface 36 of a counter 38. The phantom-line rectangle 40 in FIG. 2 represents the location where a cover plate and a scan window would be placed if a conventional horizontally disposed scanner were employed.

The assembly 32 can be used with a counter 38 which has an uninterrupted horizontal surface 36, or can be used with a counter 38 in which the scanner 28 was originally horizontally disposed in the location of the rectangle 40, but in which an opening such as the opening 22 of FIG. 1 has been covered over or eliminated. The assembly 32 is provided with an opening 42 to receive the window 26 of the scanner 28. The beam 30 generated by the scanner 28 extends through the window outwardly and downwardly toward the horizontal surface of the counter 38, so that code symbols on merchandise items which are moved along the counter surface 36 may be sensed. It will be seen that this orientation of the scanner 28 is advantageous in directing tee scanning laser beam downward so that it will not normally impinge upon the eyes of an operator or a customer. In addition, since the window 26 is located in a vertical plane above the surface 36 of the counter 38, it will not be damaged or soiled by the passage of merchandise items thereover.

The vertical mount housing assembly 32 is shown in greater detail in FIGS. 5-13 inclusive, and includes a rear unit 44, a front unit 46 and a base unit 48. A ventilating grille 50 to provide air circulation to the interior of the assembly 32 is located on the front unit 46 and an additional ventilating grille 52 is provided on the rear unit 44. A further ventilating grille 54 is loated on the rear of the base unit 48, which also has an aperture 56 to enable an electrical cable for the scanner 28 to be introduced into the interior of the assembly 32.

Figure 12A:
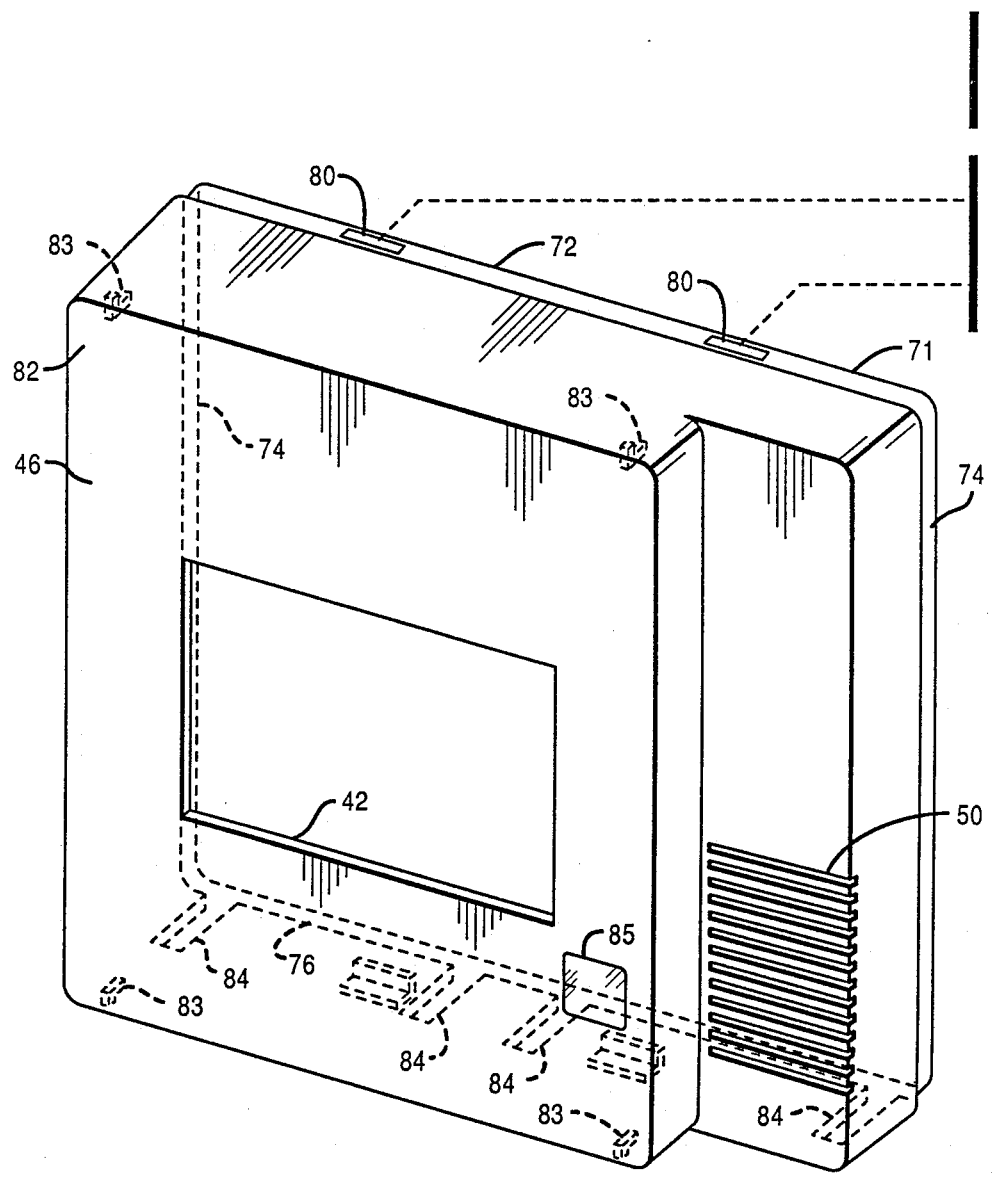
FIGS. 12A and 12B, taken together, constitute an exploded view of the front and rear members of the vertical housing.
Figure 12B:
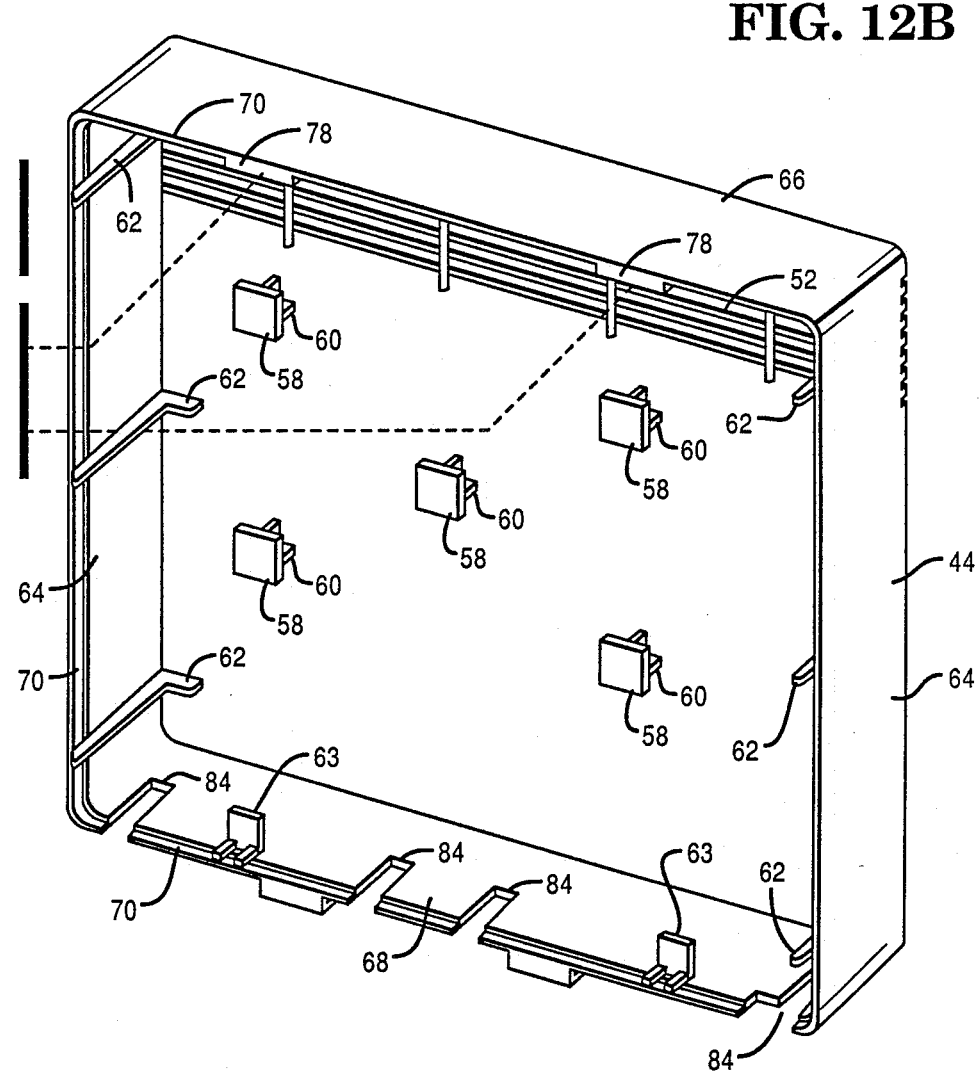
Figure 13:
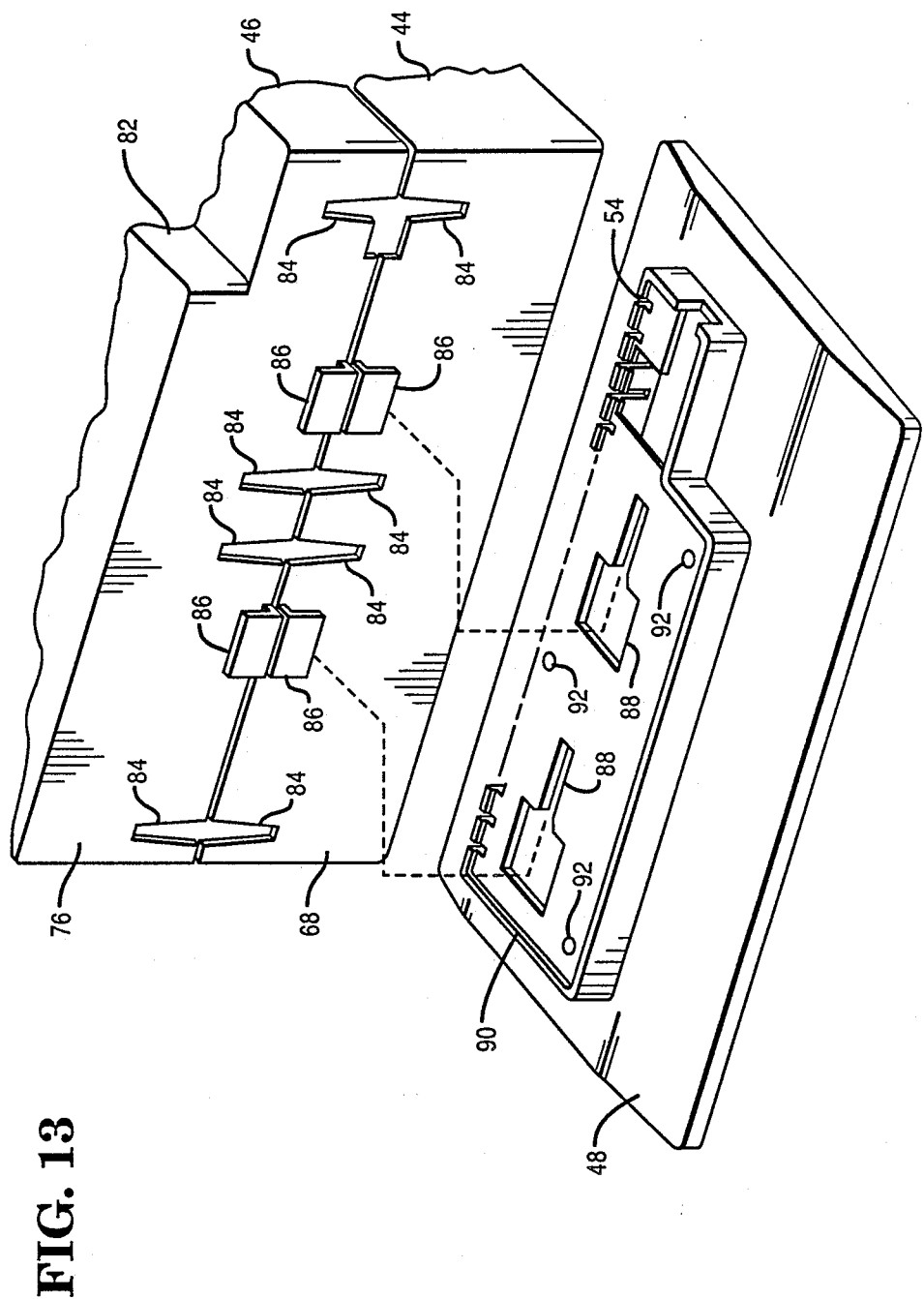
FIG. 13 is a partial exploded view, showing the manner in which the front and rear members of the vertical housing are assembled to the base member.

As shown in FIG. 12B, a plurality of pads 58, which may be of resilient material, are spaced from the rear wall of the rear unit 44 by a corresponding plurality of spacers 60. A plurality of generally "L" shaped supports 62 are secured to the inside surfaces of the vertical side walls 64 of the rear unit 44, and additional supports 63 are secured to the inside surface of the bottom wall 68. The pads 58 and the supports 62 and 63 provide support and locating means for the scanner 28 when it is positioned within the rear unit 44.

At the open edges of the side walls 64, the top wall 66 and the bottom wall 68 of the rear unit 44 is a continuous channel 70 which receives a correponding flange 71 on the edges of the upper, side and bottom walls 72, 74 and 76, respectively, of the front unit 46 when the two units are assembled. Extending downwardly from the top wall 66 of the rear unit 44 are a pair of tabs 78, which engage with a corresponding pair of slots 80 in the upper wall 72 of the front unit 46, when the two units are assembled together. The front unit 44 includes a projecting portion 82, which fits around a portion of the scanner 28 when it is placed within the assembly 32, and also includes four internal locators 83 to facilitate proper positioning of the scanner 28 within the front unit 46. An indicator panel 85 is located on the projecting portion 82.

The bottom walls 68 and 76 of the front and rear units 46 and 44 are provided with a plurality of slots 84 through certain of which electrical connections to the scanner 28 may extend. Each of said bottom walls 68 and 76 is also provided at its edge with a pair of "L" shaped projections or feet 86, which are shaped and positioned to engage and be held together by a pair of slots 88 in the base unit 48. The slots 88 include an enlarged portion and a narrow portion, so that the feet 86 may be introduced through the enlarged portions and the base member 48 may then be slid in one direction to retain the vertical portions of the feet 86 in the narrow portions of the slots 88. It will be noted that the slots 88 are located in a raised portion 90 of the base unit 48.

The scanner 28 is assembled within the vertical mount assembly 32 in the following manner. The front unit 46 is first placed on a flat secure surface, with its internal shell facing upwardly. The scanner 28 with the window 26 in place is then placed into the front unit 46 so that the window 26 is located in the opening 24 and so that the four locators 83 fit into four holes 87 (FIG. 4) in the scanner 28. The rear unit 44 is then hinged onto the front unit 46 by engaging the tabs 78 on the rear unit 44 in the slots 80 in the front unit 46, and the two units are brought together. The input/output and AC lines are connected and are routed out through the holes supplied in the bottom of the assembly. The base unit 48 is then assembled onto the front and rear units 46 and 44 by putting the feet 86 through the slots 88 and sliding the base unit with respect to the front and rear units to capture all of the parts together. The assembled front, rear and base units, with the scanner contained therein, may then be stood vertically and placed in a suitable location on the horizontal counter surface 36. If desired, screws may be placed through locating holes 92 in the raised portion 90 of the base unit 48 and the base can be screwed to the counter surface 36 before the base unit 48 is assembled to the front and rear units 46 and 44.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. An assembly for a vertically mounted optical scanner to provide for the mounting of an optical scanning unit having a transparent face comprising:
   a rear unit of generally rectangular configuration having upper, lower and side surfaces and having interior support means to receive and position an optical scanning unit, said rear unit also having first securing means adjacent its upper surface to engage a front unit, and having second securing means on its lower surface to engage a base unit;
   a front unit of generally rectangular configuration having front, upper, lower and side surfaces, having an aperture in its front surface to receive the transparent face of the optical scanning unit, having first securing means adjacent its upper surface to engage the first securing means of the rear unit and having second securing means on its lower surface to engage a base unit; and
   a base unit having a lower surface for resting upon a counter and having an upper surface which includes securing means to engage the second securing means of both the rear unit and the front unit to retain the rear unit, the front unit and the base unit in assembled relation.

2. The assembly of claim 1, in which the first securing means on the front unit comprises at least two slots and in which the first securing means on the rear unit comprises a corresponding number of projections complementary to such slots and adapted to fit therein.

3. The assembly of claim 1, in which the second securing means on the front and rear units comprise downwardly extending projections having enlarged lower portions, and in which the securing means of the base unit comprise slot means having a narrow portion and an enlarged portion adapted to slidably engage the downwardly extending projections of the front and rear units.

4. The assembly of claim 1, in which said mounting of said optical scanning unit is so oriented as to cause the transmission of scanning beams in a generally downwardly angled direction.

5. The assembly of claim 1, in which said front unit includes locating means for locating the optical scanner within said unit.

6. The assembly of claim 1, in which base unit includes a plurality of apertures to enable the assembly to be secured to said counter.

7. A kit for vertical mounting of an optical scanner on a counter comprising:

first and second vertical mount housing elements for retaining an optical scanning unit between them; and a base for retaining said first and second housing elements in assembled relationship, said base having a lower surface adapted to rest on the surface of said counter.

8. A vertical scanner assembly comprising:

a checkout counter having a horizontal surface;

an optical scanning unit; and a vertical housing member in which said optical unit is housed, comprising front and rear housing members, engaging means for securing said front and rear housing members together adjacent their top surfaces and a base member securing said front and rear housing members together adjacent their bottom surfaces, said base member including a bottom surface resting on the horizontal surface of said counter.

9. A method of converting an optical scanner which is horizontally disposed in a checkout counter to one which is vertically disposed adjacent to said counter, comprising the following steps:

(a) removing said optical scanner from said counter;

(b) providing a vertical mount housing kit comprising a front unit, a rear unit and a base unit, all having top and bottom surfaces;

(c) placing the optical scanner within said front unit;

(d) engaging said rear unit with said front unit adjacent the top surfaces thereof and positioning said rear unit over said optical scanner;

(e) securing said front and rear units together adjacent the bottom surfaces thereof by engagement with the top surface of said base unit; and (f) positioning said assembled vertical mounting housing kit, with the optical scanner inside, on the counter, with said assembled kit resting on the bottom surface of said base unit.

10. The method of claim 9, also including the step of securing the vertical mount housing kit to said counter.

11. A method of providing a vertical mounting for an optical scanner on a counter comprising the following steps:

(a) providing a vertical mount housing kit comprising a front unit, a rear unit and a base unit, all having top and bottom surfaces;

(b) placing the optical scanner within said front unit;

(c) engaging said rear unit with said front unit adjacent the top surfaces thereof and positioning said rear unit over said optical scanner;

(d) securing said front and rear units together adjacent the bottom surfaces thereof by engagement with the top surface of said base unit; and (e) positioning said assembled vertical mounting housing kit, with the optical scanner inside, on the counter, with said assembled kit resting on the bottom surface of said base unit.

12. The method of claim 11, also including the step of securing the vertical mount housing kit to the counter.

* * * * *